(No Model.)
G. JOHANNES & P. CYPHERS.
SELF SETTING ANIMAL TRAP.
No. 273,547. Patented Mar. 6, 1883.
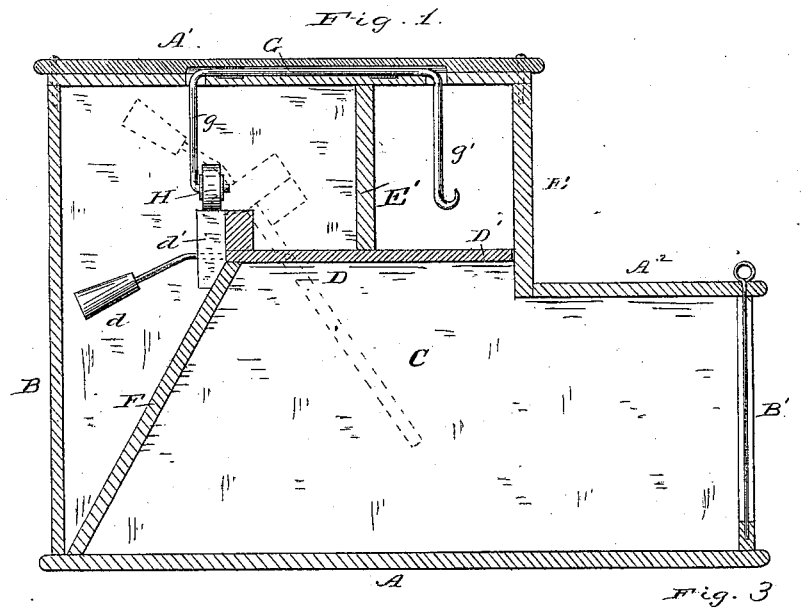
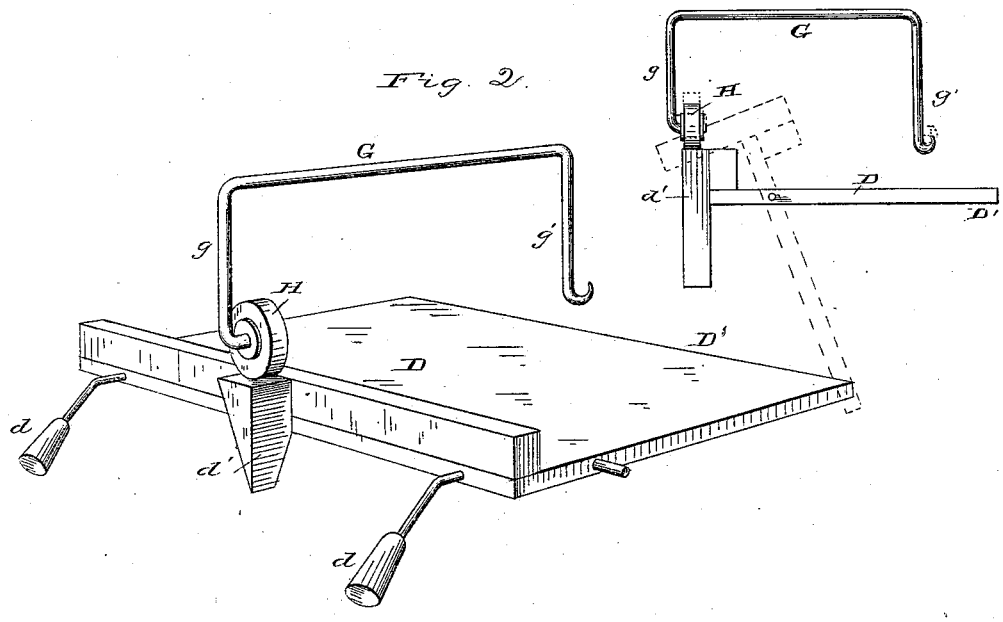
Witnesses:
N. T. Low
A. Mosher
Inventor:
Gerhard Johannes & Paul Cyphers
by J. B. Crosthwaite
Atty

UNITED STATES PATENT OFFICE.

GERHARD JOHANNES AND PAUL CYPHERS, OF HIAWATHA, KANSAS.

SELF-SETTING ANIMAL-TRAP.

SPECIFICATION forming part of Letters Patent No. 273,547, dated March 6, 1883.

Application filed April 17, 1882. (No model.)

*To all whom it may concern:*

Be it known that we, GERHARD JOHANNES and PAUL CYPHERS, citizens of the United States, residing at Hiawatha, in the county of Brown and State of Kansas, have invented certain new and useful Improvements in Self-Setting Animal-Traps; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to improvements in self-setting animal-traps.

Figure 1 is a cross-section of the trap, the dotted lines showing the position into which the tilting platform is thrown by the weight of the animal. Fig. 2 is a perspective view of the tilting platform and trigger. Fig. 3 is a perspective view of a modified form of setting projection.

The construction of our trap is substantially as follows:

A represents the bottom of the trap, to which are attached the end pieces, B B', and side pieces, C. The top is covered by the parts A' A² and the tilting platform D, which latter is pivotally connected with side pieces, C, so as to oscillate in vertical planes parallel to said side pieces. This platform is provided with weights $d$, sufficient to make that end of the tilting platform to which they are attached slightly heavier than the other end, so that the light end D' of the platform, by the falling of which the animal is precipitated into the trap, will rise again after the weight of the animal is removed. The said platform ordinarily occupies a horizontal position, being so held by pieces E' F, the former preventing the light end D' from rising beyond a certain point, and the latter forming a support for the weighted end. The piece F also serves to cut off that part of the trap which receives the animal from that which incloses the weights and tripping devices. In the end or side is any preferred opening for removing the "game."

The tripping mechanism is constructed as follows: In the top of the trap is supported horizontally the rocking shaft G, having the downwardly-projecting arms $g$ over the weighted end of the platform and $g'$ over the light end D'. This shaft G is situated in about the middle of the trap, parallel to the sides C, and across the line of pivoting of the platform D. The lower end of arm $g$ is turned horizontally to form the axis for a roller, H, which engages with a wedge-shaped block, $d'$, attached to the weighted end of the platform, thus preventing the platform from tilting. By the employment of this roller H the friction of tripping the platform is greatly lessened. Over the light end of the platform D is formed a passage-way inclosed on the top, bottom, and sides, about midway into which the arm $g'$ projects, to which arm the bait is attached.

The operation of the trap is as follows: The animal, attracted by the bait, enters the passage-way over the light end D' of the platform, being supported by the engagement of the roller H with the heavy end of the platform, as shown above. By endeavoring to remove the bait from the arm $g'$ the animal rocks the shaft G, disengages the roller H, and by the tilting of the platform is dropped into the trap. The opening thus made is immediately closed by the return of the platform. The roller, becoming again engaged, holds it in position until the trigger is again tripped. The passage-way in which the bait is suspended, being inclosed on the top, bottom, and sides, prevents the escape of the animal from the platform when it is tripped. Moreover, the platform, when tilting, throws the animal sidewise, and therein he more effectually loses his balance and is prevented from leaping away.

The return of the platform past the setting device may be insured by employing, in place of the wedge-shaped block $d'$, a projection of sufficient length to remain in contact with the setting-arm and hold it out of the path of the block during the oscillation of said platform, as shown in Fig. 3.

We are aware that traps have been made having a passage-way closed at the top and sides over one leaf of a rotating series of platforms, one of the sides of said passage-way being formed by a contiguous leaf; and we do not claim, broadly, a passage-way closed at the top and sides over a falling platform and parallel to its axis.

What we claim as our invention, and desire to secure by Letters Patent, is—

1. In an animal-trap, the combination, with the tilting single-leaf platform, passage-way over the falling end of said platform and parallel to the axis thereof, and means for tripping the platform, of a bait-arm so situated in said passage-way relative to the entrance as to be approached by the animal in a line substantially parallel to the axis of said platform, as set forth.

2. In an animal-trap, the combination, with the tilting platform, passage-way over said platform and parallel to its axis, formed of the stationary partitions E and E' and top piece, A', and means for tripping the platform, of a bait-arm so situated in said passage-way relative to the entrance as to be approached by the animal in a line substantially parallel to the axis of said platform, as set forth.

3. The combination, with the tilting platform and oscillating setting-arm $g$, situated within the trap and above the rising end of the platform, of the projection $d'$, attached to said platform in line with the setting-arm, and situated and oscillating within the trap, whereby the setting-arm is held out of the path of said projection while the latter repasses the setting-arm to its locked position, substantially as set forth.

4. In an animal-trap, the combination, with the tilting platform D and setting devices which engage with the block $d'$ and hold down the rising end of the platform, of the wedge-shaped block $d'$, attached to the platform and situated and oscillating entirely within the trap and in the same plane with the shaft G and arm $g$, whereby the setting-arm is diverted from the path of oscillation of the block to permit the return of the platform, substantially as set forth.

In testimony whereof we affix our signatures in presence of two witnesses.

GERHARD JOHANNES.
PAUL CYPHERS.

Witnesses:
JNO. E. MOON,
M. E. DE SELT.